(12) United States Patent
Sakuma et al.

(10) Patent No.: US 12,253,843 B2
(45) Date of Patent: Mar. 18, 2025

(54) OFFLINE PROGRAMMING DEVICE AND OFFLINE PROGRAMMING METHOD

(71) Applicant: Kawasaki Jukogyo Kabushiki Kaisha, Kobe (JP)

(72) Inventors: Tomoki Sakuma, Kobe (JP); Junichi Kawabata, Kobe (JP); Hiroyuki Moriishi, Kobe (JP); Takemasa Yamasaki, Kobe (JP); Shoji Shimizu, Kobe (JP); Yuhei Taniuchi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 351 days.

(21) Appl. No.: 17/786,636

(22) PCT Filed: Dec. 15, 2020

(86) PCT No.: PCT/JP2020/046831
§ 371 (c)(1),
(2) Date: Jun. 17, 2022

(87) PCT Pub. No.: WO2021/125192
PCT Pub. Date: Jun. 24, 2021

(65) Prior Publication Data
US 2023/0030278 A1  Feb. 2, 2023

(30) Foreign Application Priority Data
Dec. 17, 2019  (JP) .................. 2019-227276

(51) Int. Cl.
G05B 19/4069 (2006.01)
B25J 9/16 (2006.01)

(52) U.S. Cl.
CPC ........ *G05B 19/4069* (2013.01); *B25J 9/1664* (2013.01); *G05B 2219/39044* (2013.01); *G05B 2219/39298* (2013.01)

(58) Field of Classification Search
CPC ...... G05B 19/4069; G05B 2219/39044; G05B 2219/39298; G05B 2219/40314;
(Continued)

(56) References Cited

U.S. PATENT DOCUMENTS

2015/0379171 A1* 12/2015 Kuwahara ............... G06F 30/20
703/13
2017/0364076 A1  12/2017 Keshmiri et al.
(Continued)

FOREIGN PATENT DOCUMENTS

JP  2008-142788 A  6/2008
JP  2015-160253 A  9/2015
(Continued)

*Primary Examiner* — Kamini S Shah
*Assistant Examiner* — Mohammed Shafayet
(74) *Attorney, Agent, or Firm* — XSENSUS LLP

(57) ABSTRACT

An offline programming device includes an input unit that receives input of a plurality of teaching points, a creation unit that determines intermediate point located between adjacent teaching points and creates an operation program for the robot, a simulation unit that simulates a movement trajectory of the robot when the operation program is executed, and a display unit that displays a GUI screen representing the movement trajectory. The GUI screen includes a first display area showing a time series sequence of the plurality of teaching points and a second display area. When an error is detected in the movement trajectory, a section between the teaching points including the point in time when the error occurs is displayed in the first display area according to a first error display method.

20 Claims, 15 Drawing Sheets

(58) Field of Classification Search
CPC ........... G05B 2219/35345; G05B 2219/35349; G05B 19/4068; B25J 9/1664; B25J 9/1671
See application file for complete search history.

(56) References Cited

U.S. PATENT DOCUMENTS

| | | | | |
|---|---|---|---|---|
| 2018/0299874 | A1* | 10/2018 | Nobuhara | B25J 9/1664 |
| 2019/0143524 | A1* | 5/2019 | Takahashi | B25J 9/1682 700/264 |
| 2019/0221037 | A1* | 7/2019 | Sugaya | G06T 13/20 |
| 2020/0070281 | A1* | 3/2020 | Takeda | B23K 26/0884 |
| 2023/0125071 | A1* | 4/2023 | Nobuhara | G05B 19/425 700/255 |

FOREIGN PATENT DOCUMENTS

| | | |
|---|---|---|
| JP | 2019-84664 A | 6/2019 |
| JP | 2019-123052 A | 7/2019 |

* cited by examiner

OFFLINE PROGRAMMING DEVICE AND OFFLINE PROGRAMMING METHOD

CROSS-REFERENCE TO RELATED APPLICATIONS

This application is based on PCT filing PCT/JP2020/046831, filed on Dec. 15, 2020, and claims the priority of Japanese Patent Application No. 2019-227276 filed on Dec. 17, 2019, in Japan Patent Office, each of which is incorporated as a part of this application by reference in the entirety.

TECHNICAL FIELD

This disclosure relates to an offline programming device and an offline programming method.

BACKGROUND ART

Offline programming in which a program that defines the movement of a robot is created without using an actual robot, is known. PTL 1 discloses a method for creating a robot operation program by arranging icons each of which represents a command to a robot in order of movement using a GUI (graphical user interface). In the method disclosed in PTL 1, when placing an icon by the program creator on the program is detected, the operation program up to the placed icon is automatically simulated. If an error is detected by the simulation, a message indicating that the icon are inoperable and the reason for the inoperability is displayed.

PRIOR-ART DOCUMENTS

Patent Documents

PTL 1: Japanese Patent Application Laid-Open 2008-142788

SUMMARY OF THE INVENTION

Problems to be Solved by the Invention

In the offline programming (hereinafter referred to as "OLP"), when a user inputs teaching points that define movement points of the robot to an OLP device, it creates a program that connects the teaching points which are input. In the method disclosed in PTL 1, icons, i.e., teaching point, at which an error occurs, can be displayed. However, it cannot output error information between teaching points.

The present invention is made in view of the circumstances described above, and an object of the present invention is to provide an offline programming device and an offline programming method in which a user can understand an error that occurs between teaching points.

Means for Solving the Problems

The offline programming device according to an aspect of the present invention includes: an input unit that receives input of a plurality of teaching points; a creation unit that determines one or more intermediate points located between adjacent teaching points and creates an operation program for a robot, the operation program including the plurality of teaching points and the intermediate point; the simulation unit that simulates a movement trajectory of the robot when the operation program is executed; and the display unit that displays a GUI screen representing the movement trajectory. The GUI screen includes a first display area showing a time series sequence of the plurality of teaching points and a second display area showing a time series sequence of a plurality of the intermediate points between some of the plurality of teaching points included in the first display area on a larger scale than the first display area. When an error is detected in the movement trajectory, the first display area can display a section between the teaching points, the section including a point in time when the error occurs, by a first error display method, and the second display area can display the intermediate point corresponding to the point in time when the error occurs, by a second error display method.

An offline programming method according to an aspect of the present disclosure includes: a step of receiving input of a plurality of teaching points; a step of determining one or more intermediate points located between adjacent teaching points and creating an operation program for a robot, the operation program including the plurality of teaching points and the intermediate point; and a step of simulating a movement trajectory of the robot when the operation program is executed; and a step of displaying a GUI screen representing the movement trajectory. The GUI screen includes a first display area showing a time series sequence of the plurality of teaching points and a second display area showing a time series sequence of a plurality of the intermediate points between some of the plurality of teaching points included in the first display area on a larger scale than the first display area. When an error is detected in the movement trajectory, the first display area can display a section between the teaching points, the section including a point in time when the error occurs, by a first error display method, and the second display area can display the intermediate point corresponding to the point in time when the error occurs, by a second error display method.

By the above offline programming device and offline programming method, in the second display area, the intermediate point corresponding to the point in time when the error occurs is displayed by the second error display method. Thus, the error occurs between the teaching points can be notified to the user.

The present invention can be realized not only as an offline programming device and an offline programming method provided with the characteristic configuration described above, but also as a computer program for causing a computer to execute the characteristic steps in the offline programming method. Part or all of the offline programming device can be realized as a semiconductor integrated circuit, or as an offline programming system including the offline programming device.

Effects of the Invention

According to the invention, an error occurs between teaching points can be notified to the user.

EMBODIMENT FOR CARRYING OUT THE INVENTION

The details of the embodiments of the present invention will be described with reference to the drawings. At least a part of the embodiment described below may be combined as desired.

[1. Configuration of Offline Programming Device]

An offline programming device of this embodiment is a device for creating a program that defines a movement of a robot without being connected to the actual robot. The robot is a vertically articulated robot in one example, a horizontally articulated robot in another example, and a parallel link robot in yet another example.

Figure 1:
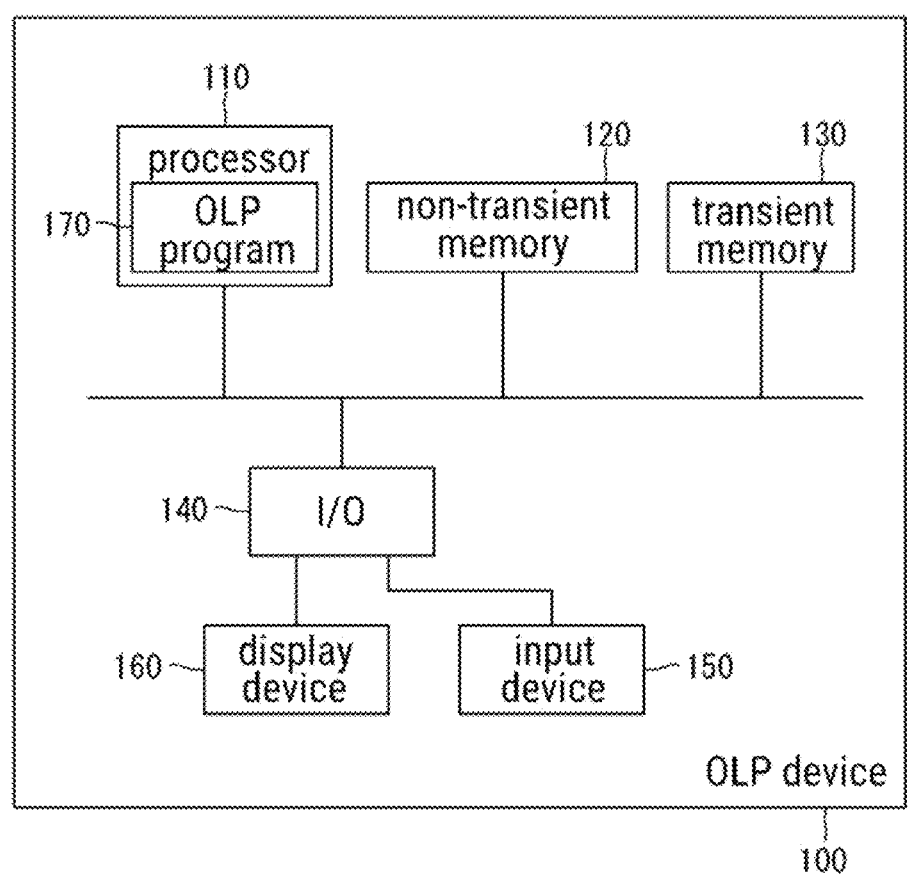
FIG. 1 is a block diagram showing an example of a configuration of an offline programming device according to an embodiment.

FIG. 1 is a block diagram of an example configuration of the offline programming device. The OLP device 100 is configured, for example, by a computer. The OLP device 100 has a processor 110, a non-transient memory 120, a transient memory 130, an input/output interface 140, an input device 150, and a display device 160.

The transient memory 130 is a volatile memory, for example, an SRAM (Static Random Access Memory), a DRAM (Dynamic Random Access Memory), or the like. The non-transient memory 120 is a non-volatile memory, for example, a flash memory, a hard disk, a ROM (Read Only Memory), or the like. The non-transient memory 120 stores an OLP program 170 as a computer program and data used for execute the OLP program 170.

The OLP device 100 includes a computer. The OLP program 170 as the computer program stored in the memory device of the computer is executed by the processor 110 as a CPU so that each function of the OLP device 100 is performed. The OLP program 170 can be stored in a recording medium, for example, a flash memory, a ROM, a CD-ROM or the like. The processor 110 executes the OLP program 170 and displays a programming screen as described later.

The processor 110 is not limited to a CPU. The processor 110 can be a hardware logic circuit, for example, an ASIC (Application Specific Integrated Circuit (ASIC), a gate array, a field programmable gate array (FPGA) or the like. In this case, the hardware logic circuit is configured to perform the same processing as the OLP program 170.

The input/output interface 140 is connected by the input device 150 and the display device 160. The input device 150 is, for example, a keyboard, a mouse, a touchpad, a pen tablet or the like, and is used by the user to input data into the OLP device 100. The display device 160 is a liquid crystal panel or an organic EL (Electro Luminescence) panel, and can display text information, images, and the like in response to a command. The input/output interface 140 is compliant with, for example, USB (Universal Serial Bus), or HDMI (High-Definition Multimedia Interface; "HDMI" is a registered trademark). The input/output interface 140 can receive data from the input device 150 and output data for display to the display device 160.

[2. Functions of the Offline Programming Device]

Figure 2:
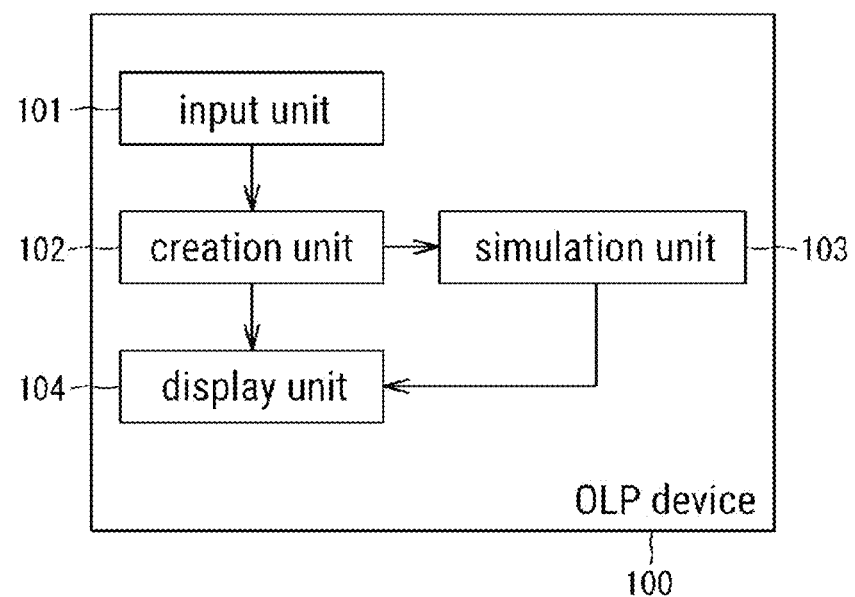
FIG. 2 is a functional block diagram showing the example of functions of the offline programming device according to the embodiment.

FIG. 2 is a functional block diagram showing an example of the functions of the OLP device 100 according to this embodiment. The OLP device 100 has functions as an input unit 101, a creation unit 102, a simulation unit 103, and a display unit 104.

The input unit 101 receives a command that defines a movement of the robot at a certain point in time, input from the user. The command includes a teaching point that defines the posture of the robot, i.e., the movement point, a movement direction of the robot, such as a straight line, a circular arc, etc., and a type of work to be performed by the robot, such as deburring, welding, moving, etc. The user can input time series commands at multiple points in time to the input unit 101.

The creation unit 102, based on the commands received via the input unit 101, determines one or more intermediate points connecting adjacent teaching points, and creates an operation program for the robot that includes the plurality of the teaching points and the intermediate points. When the operation program is executed on the robot which is an actual machine, the robot moves according to the movement trajectory in accordance with the time series commands.

The simulation unit 103 simulates the movement trajectory of the robot when the operation program is executed. In other words, the simulation unit 103 computes the movement trajectory of the robot in a three-dimensional virtual space.

The simulation unit 103 can detect an error about the movement trajectory.

Here, "error" includes an event that the computed movement trajectory cannot be realized. The error can include interference between robot components or between a robot component and another object, or an abnormal movement that exceeds the allowable range, for example, a movement in which the movement speed exceeds the maximum output of the motor or a movement that deviates from the movable range. When detecting the error, the simulation unit 103 can identify the point in time when the error occurs.

Furthermore, the simulation unit 103 can detect an event that requires warning to the user (warning event) about the movement trajectory. Here, "warning event" refers to an event that the computed movement trajectory can be realized but meets a specific warning condition. The warning condition may include, for example, a movement in which the movement speed is equal to or below the maximum output of the motor but above a specified value, an approach that exceeds the allowable range with respect to another object, or the like. When detecting the warning event, the simulation unit 103 can identify the point in time when the warning event occurs.

The display unit 104 displays a programming screen for creating an operation program. The programming screen is also a GUI screen that the movement trajectory is represented. The programming screen will be described later.

[3. Operation of the Offline Programming Device]

Figure 3A:
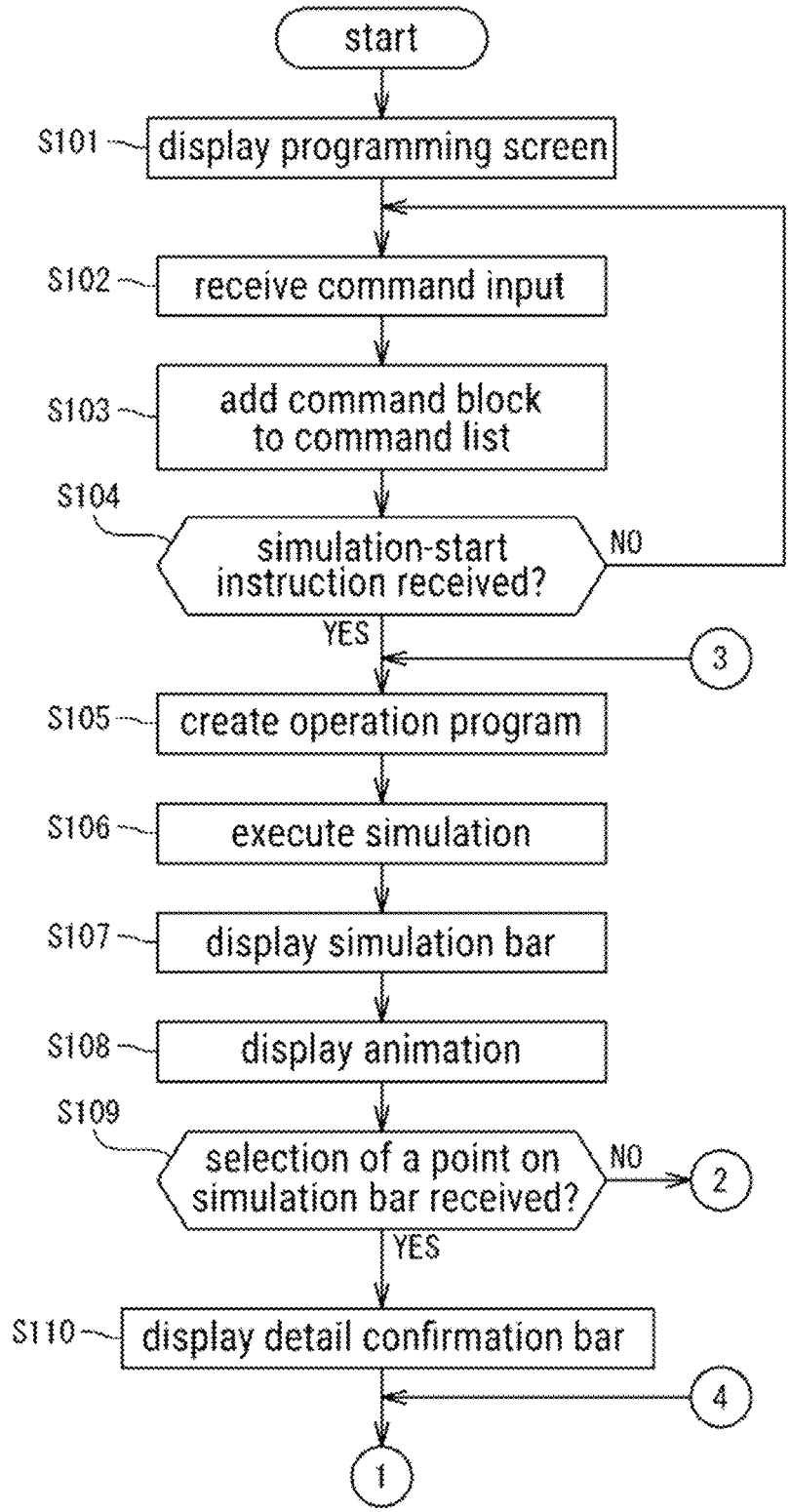
[FIG. 3A] Part of a flowchart showing an example of an operation procedure of the offline programming device according to the embodiment.
Figure 3B:
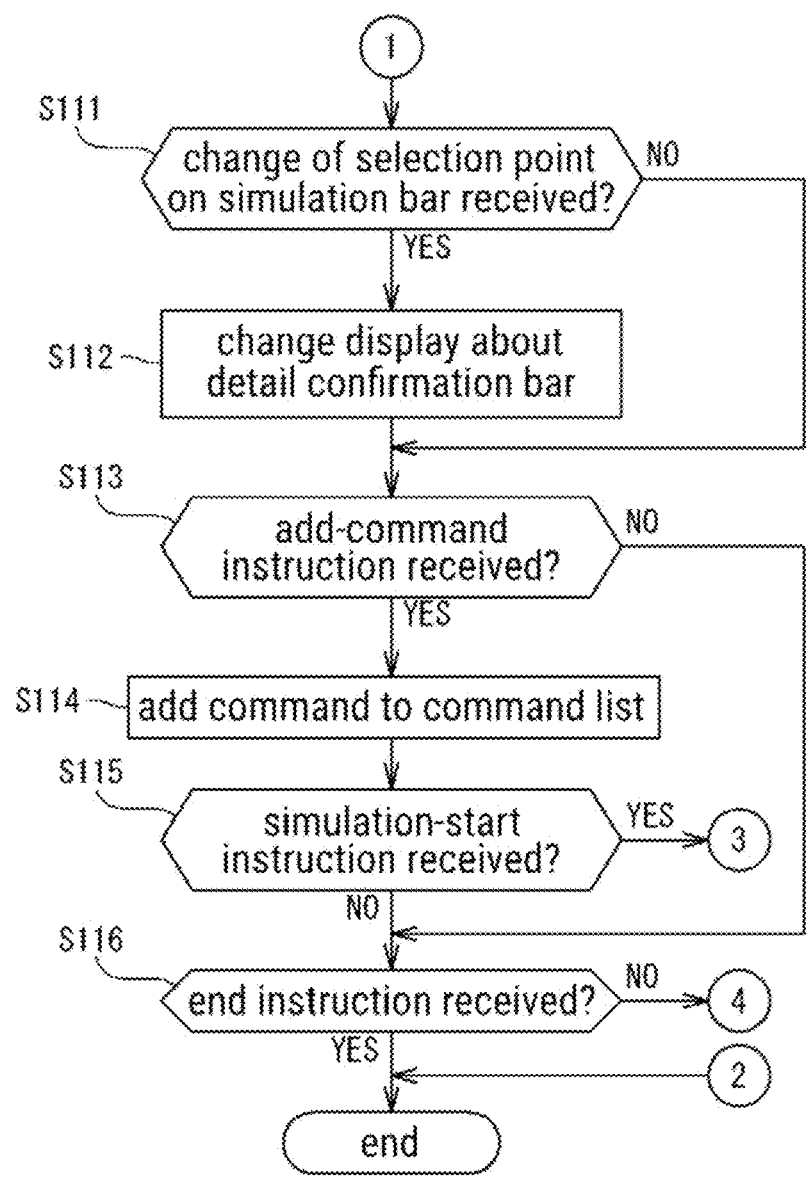
[FIG. 3B] Another part of the flowchart showing the example of the operation procedure of the offline programming device according to the embodiment.

FIGS. 3A and 3B are flowcharts showing an example of the operation procedure of the offline programming device according to this embodiment.

When the OLP program 170 starts, the processor 110 executes each of the following processes. First, the programming screen is displayed on the display device 160 (step S101). Since no commands have been registered at this time, the programming screen in its initial state, which does not include icons, images (video), and the like, is displayed.

The user can input a command to the OLP device 100 by the input device 150. The processor 110 receives the command input from the user (step S102). In addition, the processor 110 adds a command block, which is a symbol (icon) indicating the command which is input, to the command list area, which is one area included in the programming screen (step S103).

Figure 4:
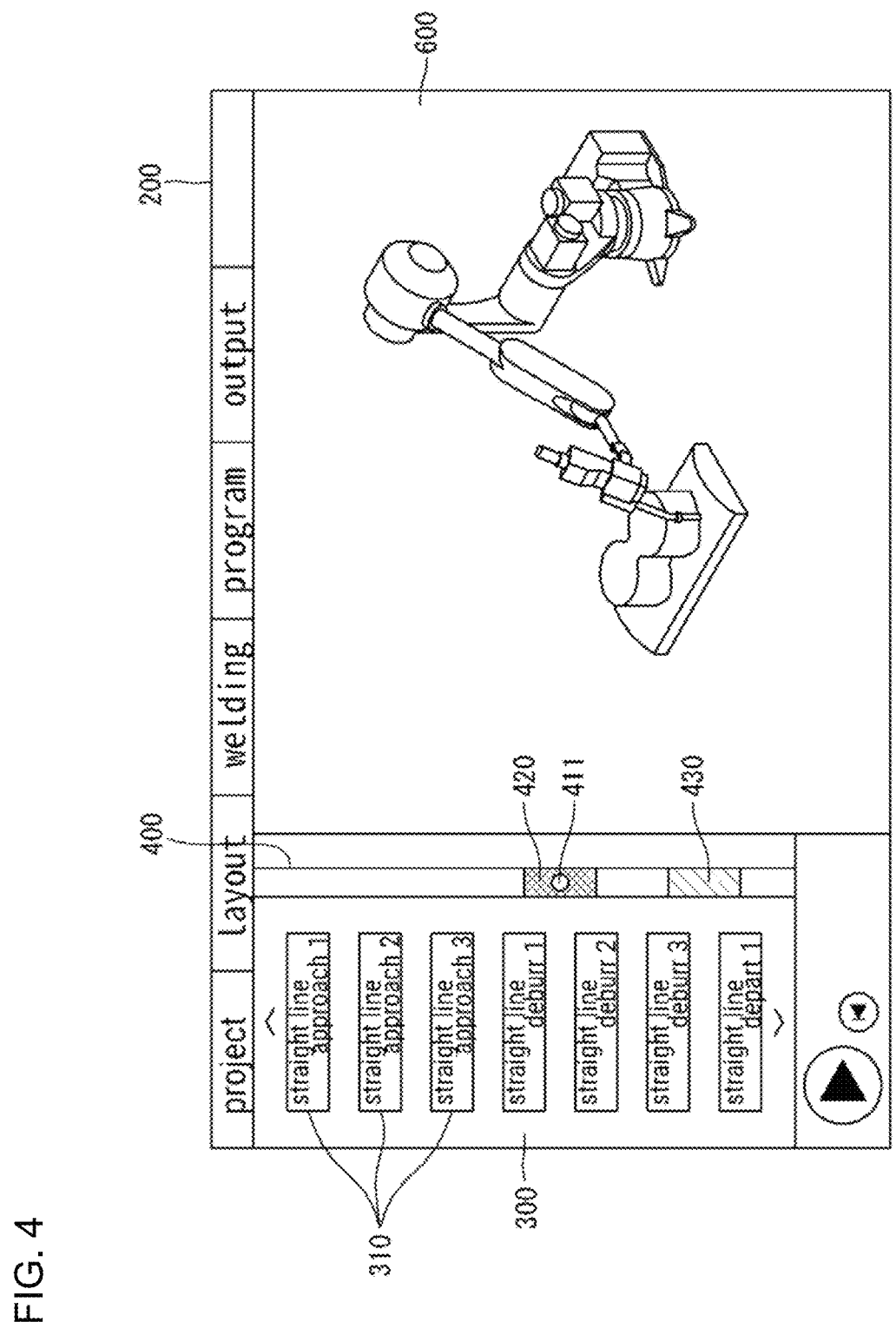
FIG. 4 is a diagram showing an example of a programming screen according to the embodiment.

FIG. 4 shows an example of the programming screen. The programming screen 200 includes a command list area 300, a simulation bar 400, and an animation display area 600. In the command list area 300, a plurality of command boxes 310 are arranged in a row in time series order. In other words, in the command list area 300, the command boxes 310 are arranged in the order in which the commands are executed.

Refer again to FIG. 3A. On the programming screen, once all the commands necessary to create the operation program have been input, the user can instruct the start of the simulation. The processor 110 determines whether the instruction to start the simulation is received or not (step S104).

If the instruction to start the simulation is not received (NO in step S104), the processor 110 executes step S102. This allows additional input of the command. If the instruction to start the simulation is received (YES in step S104), the processor 110 creates an operation program for the robot based on the input commands (step S105). Furthermore, the processor 110 executes the simulation (step S106). That is, the processor 110 simulates the movement trajectory when the operation program specified by the input command is executed.

When the simulation is completed, the processor 110 displays a simulation bar on the display device 160 (step S107) and displays an animation of the movement trajectory generated by the simulation (step S108).

Refer again to FIG. 4. The simulation bar 400 is provided on the side of the command list area 300. The simulation bar 400 is located parallel to the row of the command boxes 310 in the command list area 300. The simulation bar 400 is a linear section parallel to the row of the command boxes 310.

The simulation bar 400 corresponds to the command boxes 310 in the command list area 300. In other words, a portion beside (the right of) each of the command boxes 310 in the simulation bar 400 (a portion which is the same position vertically as each command box 310, in the simulation bar 400) corresponds to each command box 310. For example, in the example in FIG. 4, a portion of the simulation bar 400, which is beside the command box 310 containing the text "straight line approach 1", corresponds to this command box 310.

The simulation bar 400 has a length equals to or greater than the length of the row in which the command boxes 310 displayed in the command list area 300 arranged. This means that the simulation bar 400 corresponds to all the command boxes 310 displayed in the command list area 300.

The simulation bar 400 is displayed in a color (for example, white) that is different from an error color and from a warning color. If an error is detected, the portion of the simulation bar 400 corresponding to the point in time when the error occurs is displayed in the error color (for example, red). Hereinafter, the portion of the simulation bar 400 that is displayed in the error color is referred to as a first error region 420.

Since each part of the simulation bar 400 corresponds to the command box 310, the first error region 420 indicates the teaching point near the point in time of occurrence of the error. In the example in FIG. 4, the first error region 420 is located in a range from the command box 310 containing the text "straight line deburr 1" to the command box 310 containing the text "straight line deburr 2". Therefore, it is understood that the error occurs in the range from the teaching point of the command box 310 containing the text "straight line deburr 1" to the teaching point of the command box 310 containing the text "straight line deburr 2".

If a warning event is detected, the portion of the simulation bar 400 corresponding to the point in time when the warning event occurs is displayed in the warning color (for example, yellow). Hereafter, the portion of the simulation bar 400 that is displayed in the warning color is referred to as the first warning region 430.

Since each part of the simulation bar 400 corresponds to the command box 310, the first warning region 430 indicates the teaching point near the point in time of occurrence of the warning event. In the example in FIG. 4, the first warning region 430 is located in a range from the command box 310 containing the text "straight line deburr 3" to the command box 310 containing the text "straight line depart 1". Therefore, it is understood that the warning event occurs in the range from the teaching point of the command box 310 containing the text "straight line deburr 3" to the teaching point of the command box 310 containing the text "straight line depart 1".

The animation display area 600 displays the movement trajectory of the robot when the operation program is executed on the display device 160, with animation (graphical display is performed). The animation allows the user to visually confirm the movement trajectory of the robot.

Refer again to FIG. 3A. The user can select any one point on the simulation bar 400. For example, the user can select a point on the simulation bar 400 by moving the mouse pointer to the point and clicking, or by touching the position corresponding to the above-described point with a finger or a pen on a touchpad or a pen tablet.

The processor 110 determines whether a selection of a point on the simulation bar 400 from the user is received (step S109). If a selection of the point is not received from the user (NO in step S109), the processing by the OLP device 100 ends. If a selection of the point is received on the simulation bar 400 from the user is received (YES in step S109), the processor 110 displays a detail confirmation bar on the display device 160 (step S110).

Figure 5:
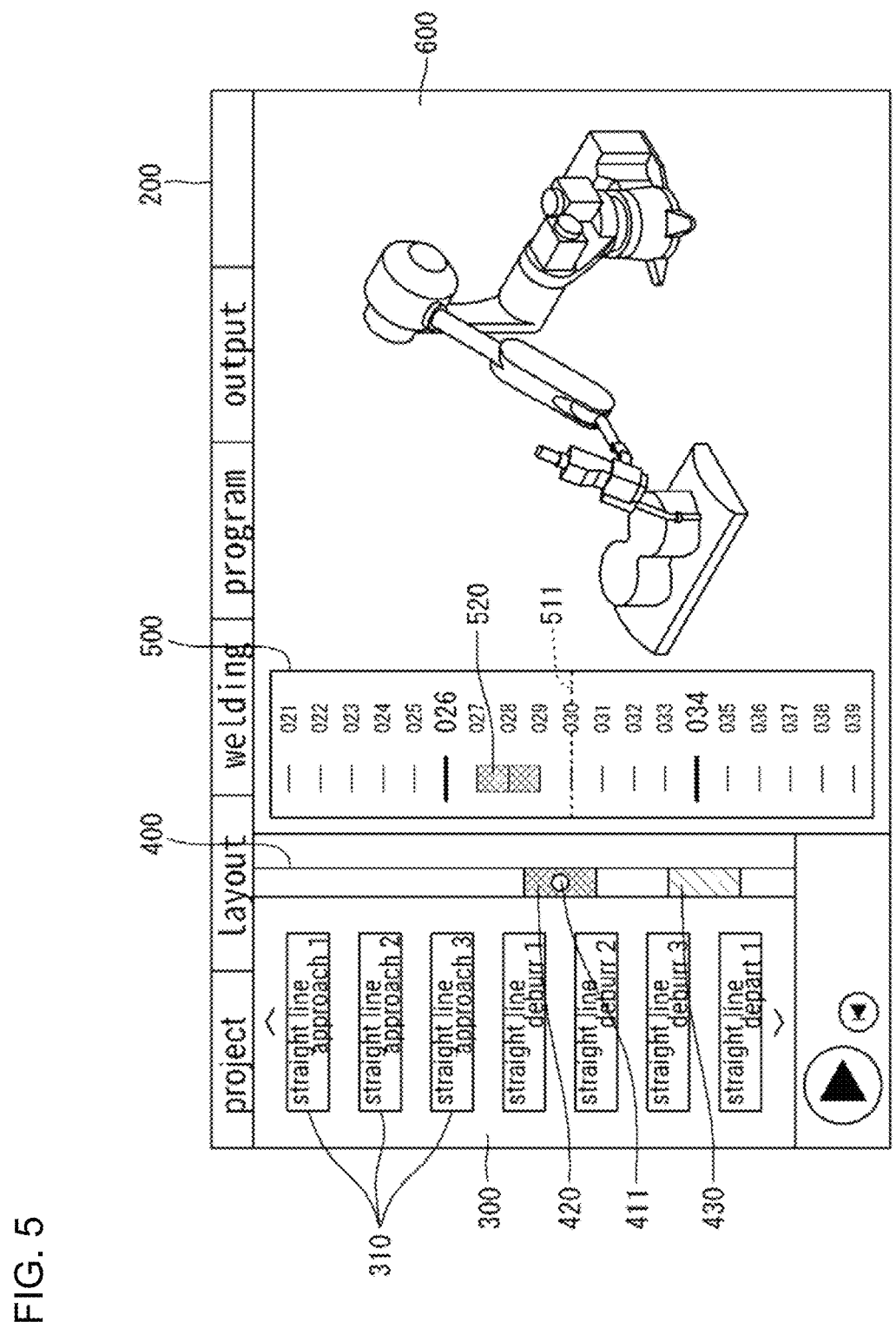
FIG. 5 is a diagram showing an example of a programming screen including a detail confirmation bar.

FIG. 5 shows an example of the programming screen including the detail confirmation bar. When a point on the simulation bar 400 is selected, a pointer 411 is displayed at the position of the selected point, and a detail confirmation bar 500 is displayed on the side of the simulation bar 400. The detail confirmation bar (second display area) 500 is displayed in part of the animation display area 600.

The detail confirmation bar 500 shows a time series sequence of a plurality of intermediate points between adjacent teaching points. In the detail confirmation bar 500, the time series sequence of the intermediate points in the section before and after the selected point in the simulation bar 400 is shown on a larger scale than the simulation bar 400. In other words, the detail confirmation bar 500 can display detailed information that cannot be displayed on the simulation bar 400.

In a specific example, the detail confirmation bar 500 includes tick marks indicating each of one or more teaching points and a plurality of intermediate points. For example, the tick mark for the intermediate point is represented by a thin line and the tick mark for the teaching point is represented by a thick line. In other words, in the detail confirmation bar 500, the intermediate point and the teaching point are displayed distinguishable from each other.

The detail confirmation bar 500 is displayed in a color (for example, black) that is different from the error color and from the warning color. If an error is detected, the portion of the detail confirmation bar 500 corresponding to the point in time when the error occurs is displayed in the error color. Hereinafter, the portion of the detail confirmation bar 500 that is displayed in the error color is referred to as a second error region 520.

Since the detail confirmation bar 500 shows a time series sequence of the intermediate points, the second error region 520 indicates the intermediate point near the point in time of occurrence of the error. In the example in FIG. 5, the second error region 520 is located in a range from the intermediate point of the tick mark "027" to the intermediate point of the tick mark "029". Therefore, it is understood that the error occurs in the range. This allows the user to roughly identify the point in time when the error occurs by the simulation bar 400, and to identify the point in time when the error occurs in detail by the detail confirmation bar 500.

If the warning event is detected, the portion of the detail confirmation bar 500 corresponding to the point in time when the warning event occurs is displayed in the warning color. Hereinafter, the portion of the detail confirmation bar 500 that is displayed in the warning color is referred to as a second warning region. Since the detail confirmation bar 500 shows a time series sequence of the intermediate points, the second warning region indicates the intermediate point near the point in time of occurrence of the warning event. In the example in FIG. 5, although the second warning region is outside the display section of the detail confirmation bar 500 and is not shown, but is displayed in the same form as the second error region 520. This allows the user to roughly identify the point in time when the warning event occurs by the simulation bar 400, and to identify the point in time when the warning event occurs in detail by the detail confirmation bar 500.

Refer FIG. 3B. The user can slide the pointer 411 along the simulation bar 400. For example, the user can slide the pointer 411 by dragging or swiping with the pointer 411 selected. As the pointer 411 slides, the point selected on the simulation bar 400 is changed.

The processor 110 determines whether a change of the selection point on the simulation bar 400 from the user is received (step S111). If the change of the selection point from the user is not received (NO in step S111), the processor 110 changes the process to be executed to step S113. If the change of the selection point from the user is received (YES in step S111), the processor 110 makes the display device 160 change the display of the detail confirmation bar 500 (step S112).

Figure 6A:
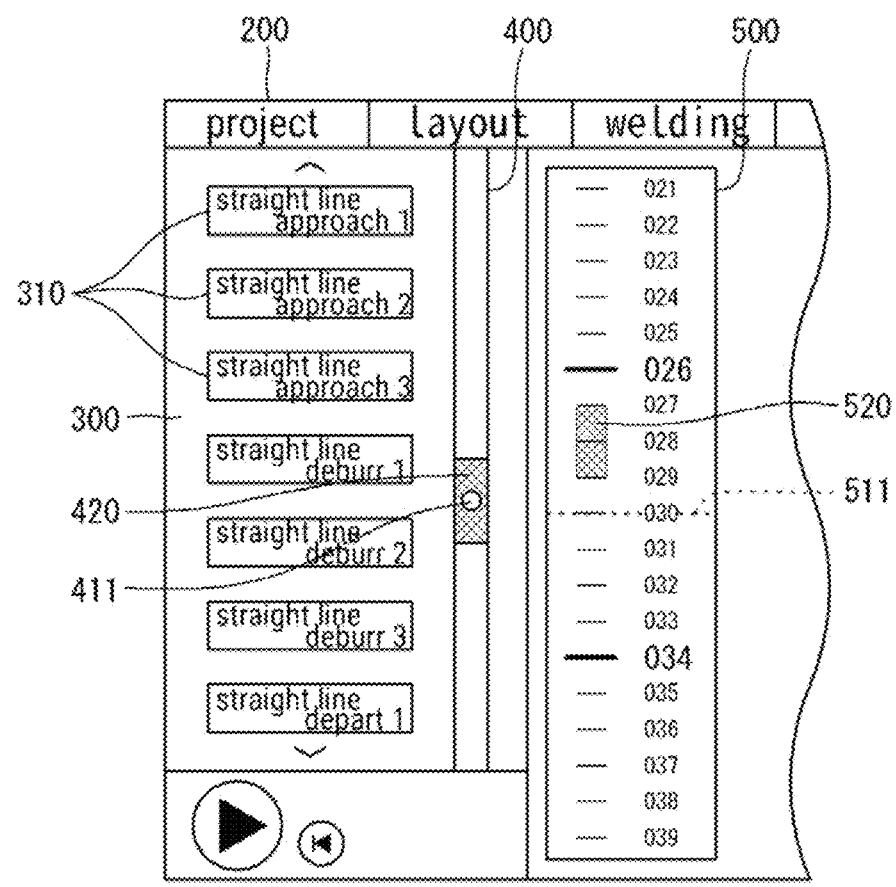
[FIG. 6A] A diagram showing an example of a change in the display of the detail confirmation bar.
Figure 6B:
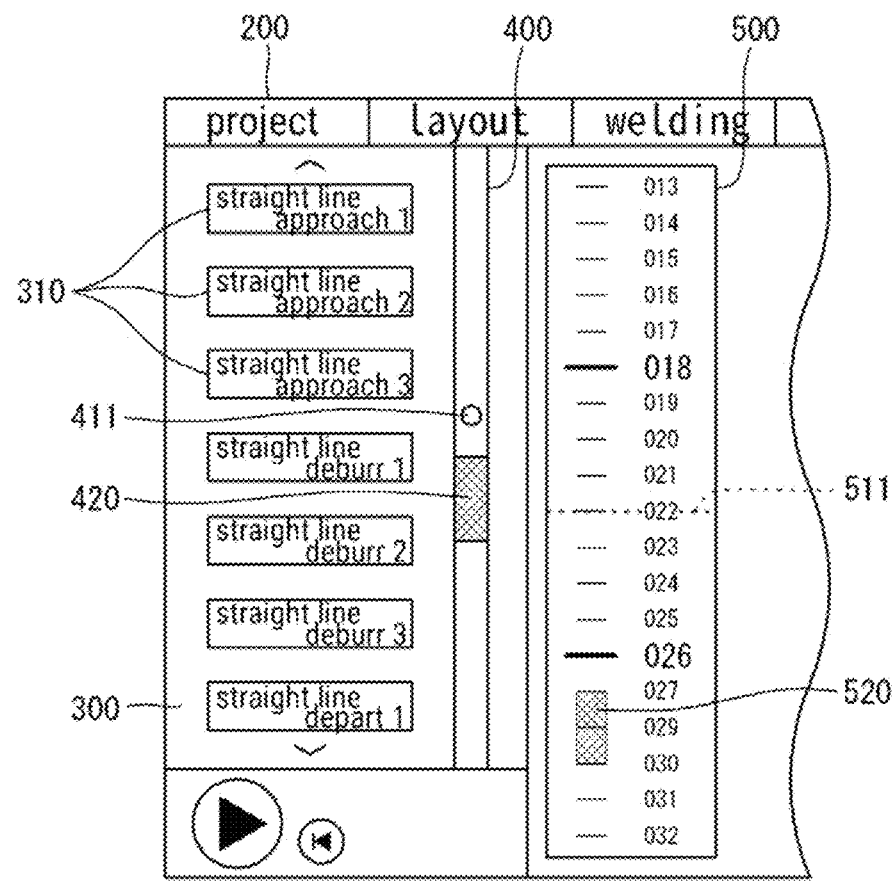
[FIG. 6B] A diagram showing an example of a change in the display of the detail confirmation bar.

FIGS. 6A and 6B show one example of the change in the display of the detail confirmation bar 500. FIGS. 6A and 6B show before and after the change in the display of the detail confirmation bar 500. As shown in FIGS. 6A and 6B, an indicator 511 is displayed at the vertical center of the detail confirmation bar 500, for indicating the selection point. The point in time indicated by the indicator 511 is the same as the point in time selected by the pointer 411. That is, the point in time selected by the pointer 411 and indicated on the simulation bar 400 is the same as the point in time indicated by the indicator 511 on the detail confirmation bar 500. The indicator 511 is displayed fixedly. That is, the indicator 511 is always located at the vertical center of the detail confirmation bar 500, and the position of the indicator 511 does not change even if the pointer 411 is slid.

As an example is shown in FIGS. 6A and 6B, when the pointer 411 is slid, the section indicated by the detail confirmation bar 500 is changed according to the change in position of the pointer 411. In other words, in FIG. 6A, the detail confirmation bar 500 indicates the section from the tick mark "021" to the tick mark "039", in FIG. 6B, the detail confirmation bar 500 indicates the section from the tick mark "013" to the tick mark "032". In this way, the section displayed by the detail confirmation bar 500 changes according to the change of the selection point by the user. Therefore, the user can slide the pointer 411 to display the detailed information of the section he/she wants to check on the detail confirmation bar 500. In the examples shown in FIGS. 6A and 6B, the indicator 511 is a dashed line extending horizontally, but it is not limited to this. For example, the indicator 511 may be a solid line extending horizontally, or it may be a circle, an arrow, or other symbol.

When the pointer 411 is slid and the section indicated by the detail confirmation bar 500 is changed, the position of the second error region 520 is changed as a result of the above-described change. The second error region 520 appears in the section where the error occurs in the detail confirmation bar 500. Therefore, when the position of the pointer 411 is changed and the display section of the detail confirmation bar 500 is changed, the position of the second error region 520 changes by the same amount as the change in the display section and in the same direction as the change in the display section. If part or all of the second error region 520 changes to deviate from the display range of the detail confirmation bar 500, the part or all of the second error region 520 is not displayed in the detail confirmation bar 500. Likewise, the position of the second warning region also changes as the display section of the detail confirmation bar 500 changes.

Refer again to FIG. 3B. The user may edit the operation program and change a part of the movement trajectory of the robot. For example, if an error occurs where a part of the robot interferes with another object, the user changes the movement trajectory to avoid the interference. In the OLP device 100 in this embodiment, the user can use the detail confirmation bar 500 to edit the operation program.

The user adds a new command to edit the operation program. In this case, the user can adjust the pointer 411 to the point in time at which he/she wishes to add a command, and instruct the OLP device 100 to add a new command at that point in time. For example, the user confirm that one intermediate point is selected on the detail confirmation bar 500, and then give an instruction to add a command to that intermediate point to the OLP device 100.

The instruction to add a command can be realized by various methods. For example, a button for adding a command may be displayed in the command list area 300, and the user may select the button to instruct to add a command. Furthermore, a drop-down list containing multiple items may be displayed in response to a click or touch operation on the programming screen 200, and the user may select the "add command" item in the drop-down list to instruct to add a command.

The processor 110 determines whether the instruction to add a command from the user is received or not (step S113). If the instruction to add a command is not received (NO in step S113), the processor 110 advances the process to be executed to step S116. On the other hand, if the instruction to add a command is received (YES in step S113), the processor 110 adds the command to the point in time that is currently selected (step S114). In adding a command, a teaching point is set at the selected point in time. Moreover, the movement direction of the robot and the type of work included in the new command are specified by the user.

The processor 110 determines whether the instruction to start the simulation is received or not (step S115). If the instruction to start the simulation is not received (YES in step S115), the processor 110 changes the process to be executed to step S105. As a result, an operation program containing the added command is created and the simulation is executed.

On the other hand, if the instruction to start the simulation is not received (NO in step S115), the processor 110 determines whether an instruction to end the processes is received from the user or not (step S116). If the instruction to end is not received (NO in step S116), the processor 110 changes the process to be executed to step S111. If the instruction to quit of the processes from the user is received (YES in step S116), the processor 110 ends the process of the OLP program 170. This concludes the processing by the OLP device 100.

[4. Display Embodiments of Programming Screen]

The programming screen 200, in particular the simulation bar 400 and the detail confirmation bar 500 have various display embodiments. Examples of the display embodiments of the programming screen 200 will be described below.

The simulation bar 400 changes its display form depending on the point in time when the error or the warning event occurs. More specifically, the display form the simulation bar 400 varies depending on whether the error or the warning event occurs between two adjacent teaching points or at a teaching point.

Figure 7A:
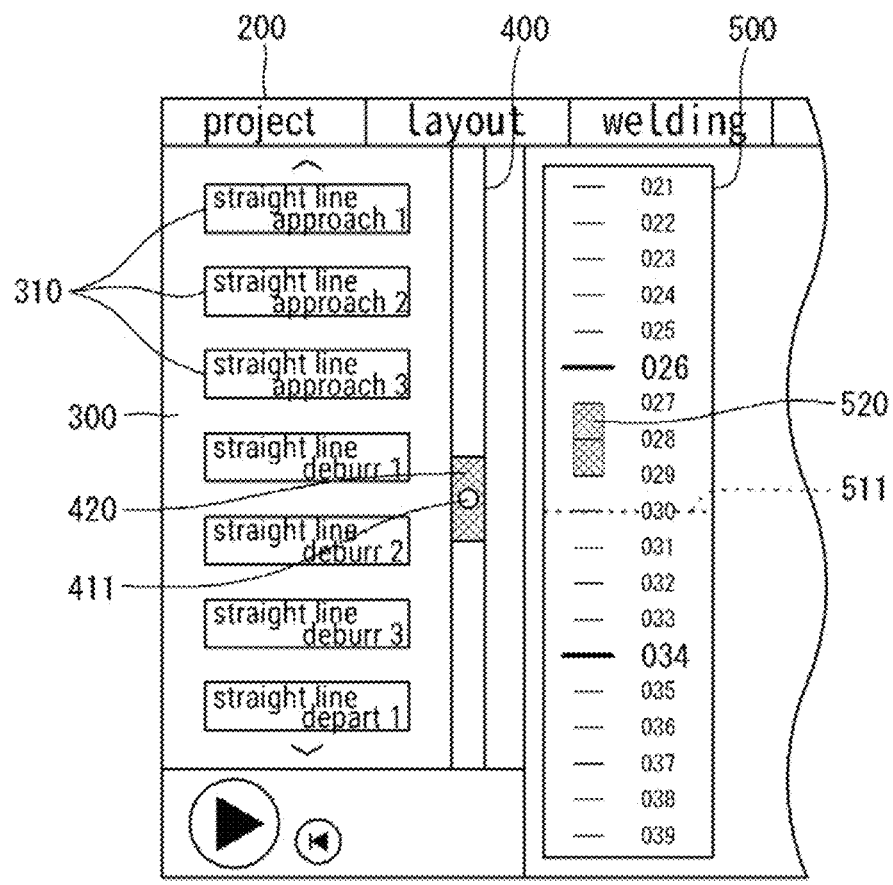
[FIG. 7A] A diagram showing an example of a display form of the simulation bar when an error occurs between two adjacent teaching points.
Figure 7B:
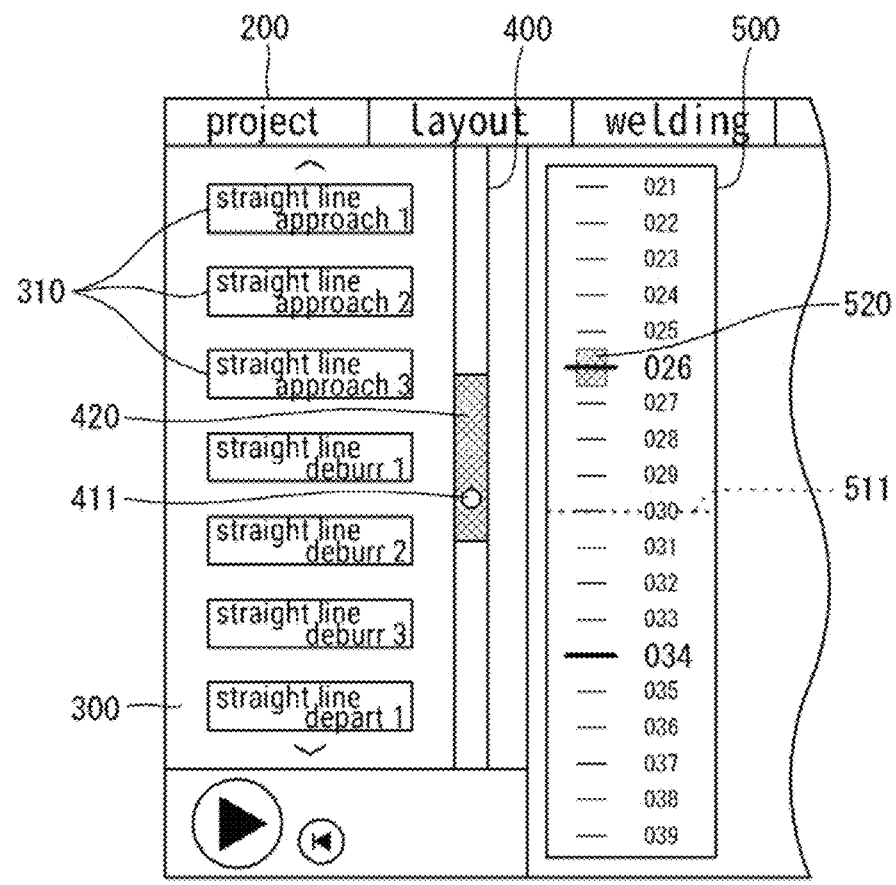
[FIG. 7B] A diagram showing an example of a display form of the simulation bar when an error occurs at the teaching point.

FIGS. 7A and 7B illustrate the display forms of the simulation bar depending on the point in time when the error occurs. FIG. 7A shows an example of the display form of the simulation bar 400 when the error occurs between two adjacent teaching points. FIG. 7B shows an example of the display form of the simulation bar 400 when the error occurs at a teaching point.

If the error occurs between two adjacent teaching points, i.e., if the error occurs at an intermediate point or in a section containing multiple intermediate points (but excluding teaching points), the first error region 420 is located in the section between two adjacent teaching points that sandwich the point in time when the error occurs, as shown in FIG. 7A. Here, "section between two teaching points" may include the teaching points at both ends or may exclude the teaching points at both ends. "Section between two teaching points" may be a section including the teaching point at one end and not including the teaching point at the other end. In the example in FIG. 7A, the first error region 420 is located in a section between the teaching point at the command box 310 for "straight line deburr 1" and the teaching point at the command box 310 for "straight line deburr 2". As a result, the user can understand that the error occurs between the teaching point of "straight line deburr 1" and the teaching point of "straight line deburr 2".

The detail confirmation bar 500 indicates an error occurrence point in a more detailed manner. In other words, in the detail confirmation bar 500, the second error region 520 is located in a smaller section than the first error region 420 in the simulation bar 400. The second error region 520 is provided in a section between a plurality of intermediate points including the point in time at which the error occurs. For example, when an error occurs during a period of time including multiple intermediate points, the second error region 520 is located in that period of time of the detail confirmation bar 500.

In other examples, when an error occurs at an intermediate point, the second error region 520 is located in a section including the intermediate point, for example, in a section between intermediate points (or teaching points) of both sides each of which is adjacent to the intermediate point.

If the error occurs at one teaching point, i.e., if the error occurs at only one teaching point, or if the error occurs in a section including one teaching point (but not including the other teaching points), the first error region 420 is located in a section over three consecutive teaching points, as shown in FIG. 7B. The three consecutive teaching points are the teaching point at the time the error occurred and the two teaching points of both sides that are adjacent to it. In the example in FIG. 7B, the first error region 420 is located in a section over the teaching point of the command box 310 for "straight line approach 3", the teaching point of the command box 310 for "straight line deburr 1", and the teaching point of the command box 310 for "straight line deburr 2". This allows the user to understand that the error occurs at the teaching point of "straight line deburr 1".

In this case, the detail confirmation bar 500 also indicates an error occurrence point in a more detailed manner. For example, if an error occurs at only one teaching point, the second error region 520 is located in a section including the teaching point, for example, a section between the intermediate points of both sides each of which is adjacent to this teaching point. In another example, if an error occurs in a period of time that includes one teaching point and one or more intermediate points, the second error region 520 is located in that period of time in the detail confirmation bar 500.

Figure 8A:
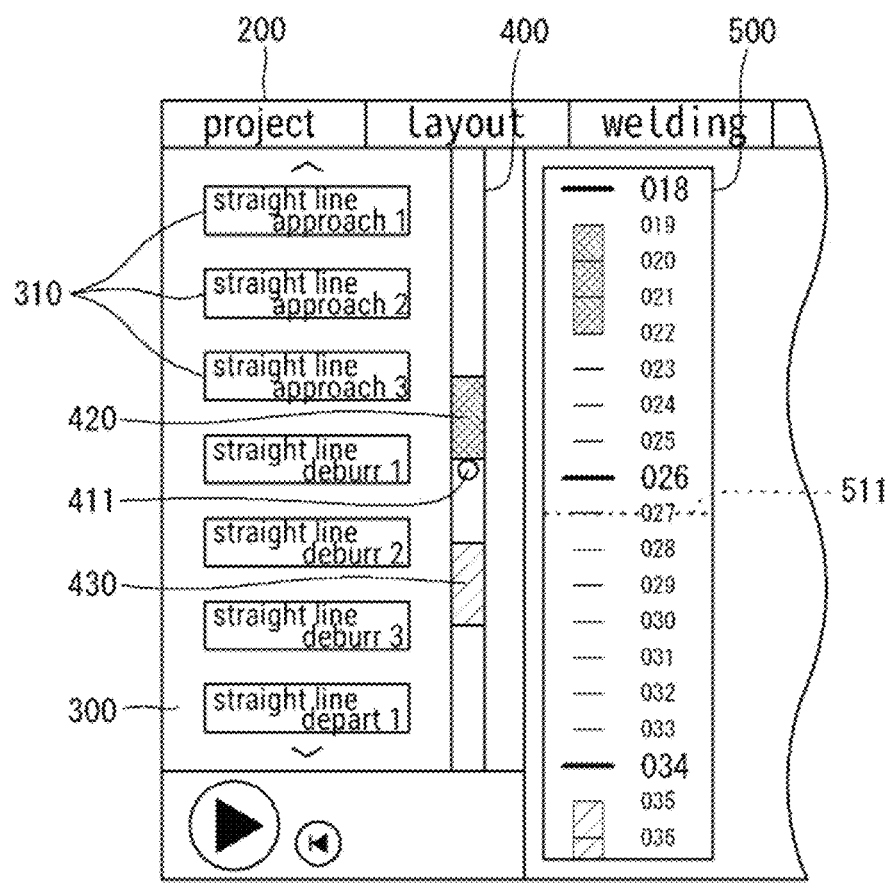
[FIG. 8A] A diagram showing an example of a display form of the simulation bar when an error and a warning event occur.

If both of an error and a warning event occur in the movement trajectory of the robot, the first error region 420 and the first warning region 430 is provided in the simulation bar 400, respectively. FIG. 8A shows an example of the display form of the simulation bar when an error and a warning event occur, and FIG. 8B shows another example.

FIG. 8A shows an example in which the first error region 420 and the first warning region 430 are far from each other. As described above, the first error region 420 and the first warning region appear in the section defined by the point in time of occurrence of the error and the warning event. When the first error region 420 and the first warning region 430 do not overlap, i.e. when the first error region 420 and the first warning region 430 are in contact (the teaching point at one end of the first error region 420 is the same as the teaching point at the other end of the first warning region), or when the first error region 420 and the first warning region 430 are far from each other, each of the first error region 420 and the first warning region 430 is displayed entirely.

In the example in FIG. 8A, the error occurs in the section between the teaching point of the command box 310 for "straight line approach 3" and the teaching point of the command box 310 for "straight line deburr 1", and the warning event occurs in the section between the teaching point of the command box 310 for "straight line deburr 2" and the teaching point of the command box 310 for "straight line deburr 3". In this case, the first error region 420 is located in a section between the teaching point of the command box 310 for "straight line approach 3" and the teaching point of the command box 310 for "straight line deburr 1", and the first warning region 430 is located in a section between the teaching points of the command box 310 for "straight line deburr 2" and the teaching points of the command box 310 for "straight line deburr 3". In this example, the first error region 420 and the first warning region 430 are far from each other.

Figure 8B:
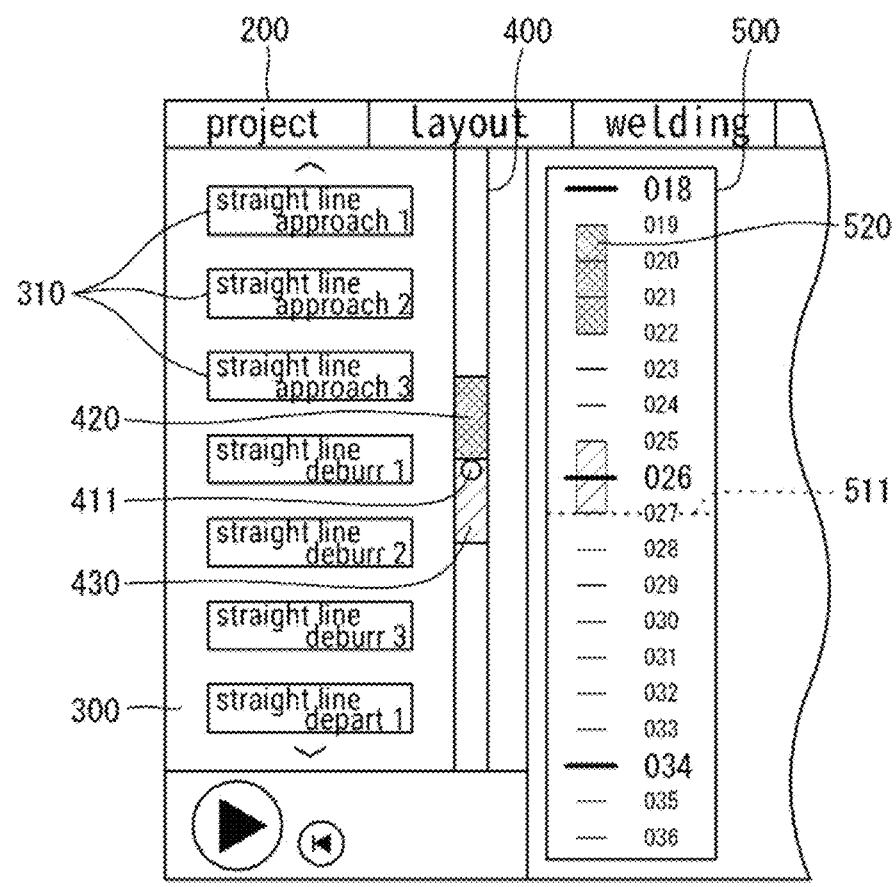
[FIG. 8B] A diagram showing another example of the display of the simulation bar when an error and a warning event occur.

FIG. 8B shows an example in which the first error region 420 and the first warning region 430 partially overlap each other in the simulation bar 400. When the first error region 420 and the first warning region 430 overlap each other at least in part, the first error region 420 is displayed being given priority. In other words, the range the first error region 420 and the first warning region overlap is displayed as the first error region 420 and not as the first warning region 430.

In the example in FIG. 8B, the error occurs in the section between the teaching point of the command box 310 for "straight line approach 3" and the teaching point of the command box 310 for "straight line deburr 1", and the warning event occurs at the teaching point of the command box 310 for "straight line deburr 1". In this case, the section between the teaching point of the command box 310 for "straight line approach 3" and the teaching point of the command box 310 for "straight line deburr 1" can be considered to be the first error region 420, and the section between the teaching point of the command box 310 for "straight line approach 3" and the teaching point of the command box 310 for "straight line deburr 2" can be considered to be the first warning region 430. However, the first error region 420 and the first warning region 430 overlap each other in the section between the teaching point of the command box 310 for "straight line approach 3" and the teaching point of the command box 310 for "straight line deburr 1". Therefore, the first error region 420 is displayed in this section.

The teaching point described above is a command (movement command) that defines the posture and the movement of the robot. In other words, the command described above includes the teaching point defining the posture of the robot, i.e., the movement point, the movement direction of the robot, such as a straight line or a circular arc, and the type of work to be performed by the robot, such as deburring, welding, or moving. In programming for operation of the robot, a command that does not define the posture of the robot (non-movement command) may be given. For example, inputting or outputting a control signal to or from the robot, setting a standby time of the robot, calling a subprogram, changing a precision of the movement, and setting the machining position of the end effector attached at the end of the arm of the robot are non-movement commands.

Figure 9A:
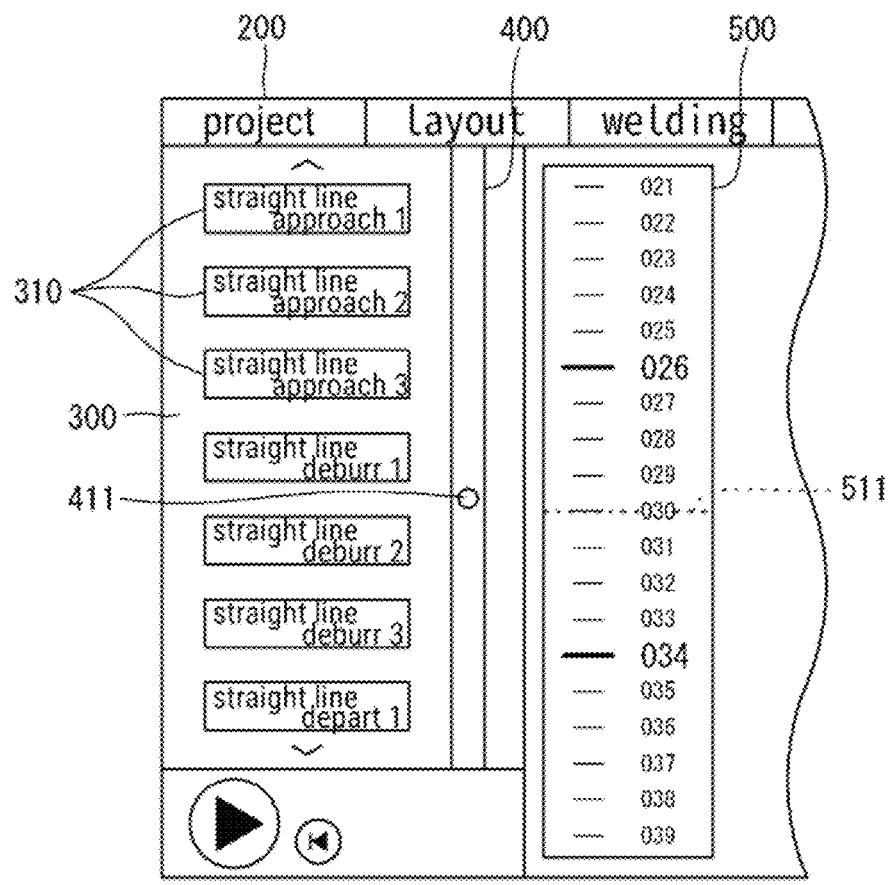
[FIG. 9A] A diagram showing an example of the programming screen when the second teaching point is not given.

The programming screen 200 in the case where the non-movement command as described above is given will be described. FIG. 9A shows an example of the programming screen 200 when a non-movement command is not given, and FIG. 9B shows an example of the programming screen 200 when a non-movement command is given.

In the example of FIG. 9A, only the command boxes 310 containing the movement command, such as "straight line approach 1", "straight line deburr 1", "straight line depart 1", are included in the command list area 300. These command boxes 310 (i.e., teaching points) are arranged in time series order, and the simulation bar 400 shows the time series sequence of the teaching points represented in the command list area 300. The detail confirmation bar 500 shows an enlarged time series sequence of the teaching points and intermediate points represented in the command list area 300. In other words, the simulation bar 400 shows the time series sequence of the movement commands in the command list area 300, and the detail confirmation bar 500 shows the time series sequence of the plurality of intermediate points between the multiple movement commands.

Figure 9B:
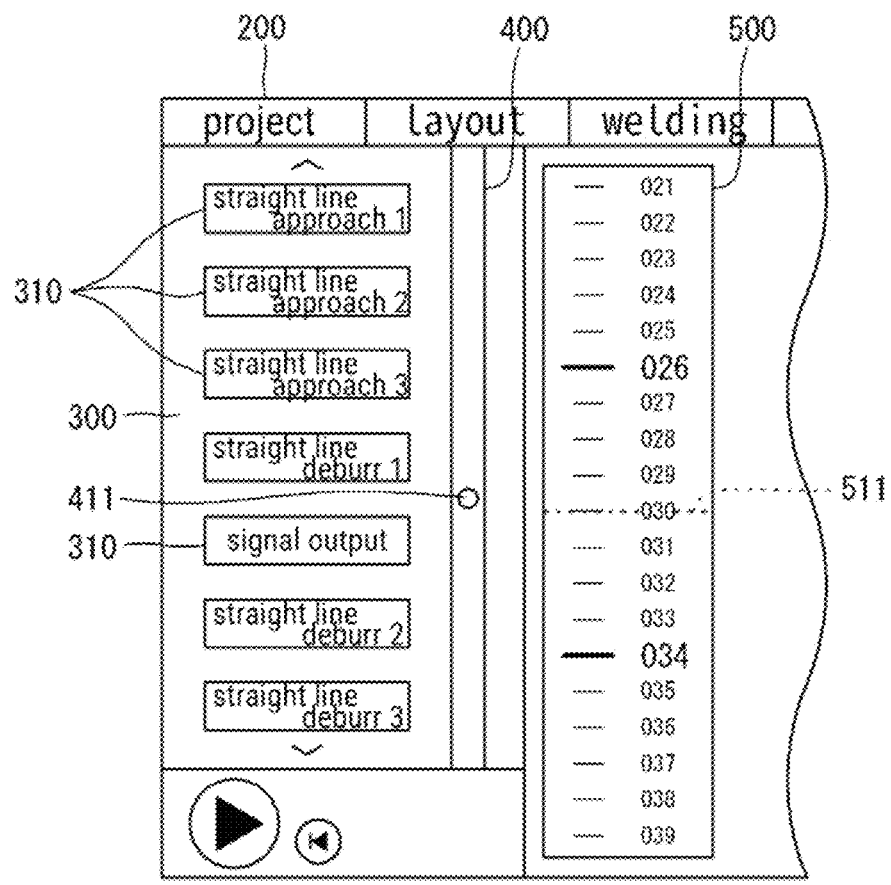
[FIG. 9B] A diagram showing an example of the programming screen when the second teaching point is given.

In the example of FIG. 9B, not only the command boxes 310 containing the movement command, such as "straight line approach 1", "straight line deburr 1", "straight line depart 1", but the command box 310 containing a non-movement command, such as "signal output", are included in that area. The timing of the signal output is between the teaching point of "straight line approach 3" and the teaching point of "straight line deburr 1". However, the signal output does not appear in the movement trajectory of the robot. The simulation bar 400 shows the time series sequence of the movement commands and non-movement commands in the command list area 300. In other words, in the simulation bar 400, the side part of the command box 310 of "signal output" indicates a non-movement command "signal output".

The non-movement command does not reflect to the detail confirmation bar 500. In other words, the detail confirmation bar 500 shows the time series sequence of the multiple intermediate points between the multiple movement commands, excluding the non-movement commands. In the examples in FIGS. 9A and 9B, with respect to the detail confirmation bar 500, the tick mark "026" is the teaching point of the movement command "straight line deburr 1", and the tick mark "034" is the teaching point of the movement command "straight line deburr 2". In the example in FIG. 9B, the command box 310 for a non-movement command "signal output" is inserted between the command box 310 for "straight line deburr 1" and the command box 310 for "straight line deburr 2". However, the detail confirmation bar 500 shown in FIG. 9B is the same as the detail confirmation bar 500 shown in FIG. 9A. That is, in the detail confirmation bar 500 shown in FIG. 9B, a tick mark corresponding to the non-movement command "signal output" is not located between the tick mark "026" and the tick mark "034", which are both movement commands.

Thus, the detail confirmation bar 500 does not reflect the non-movement command. Therefore, the detail confirmation bar 500 excludes non-movement commands that do not appear in the movement trajectory created by the simulation, and shows the teaching points and the intermediate points of the movement commands included in the movement trajectory. This allows providing the user with a detailed movement trajectory in time series order.

Figure 9C:
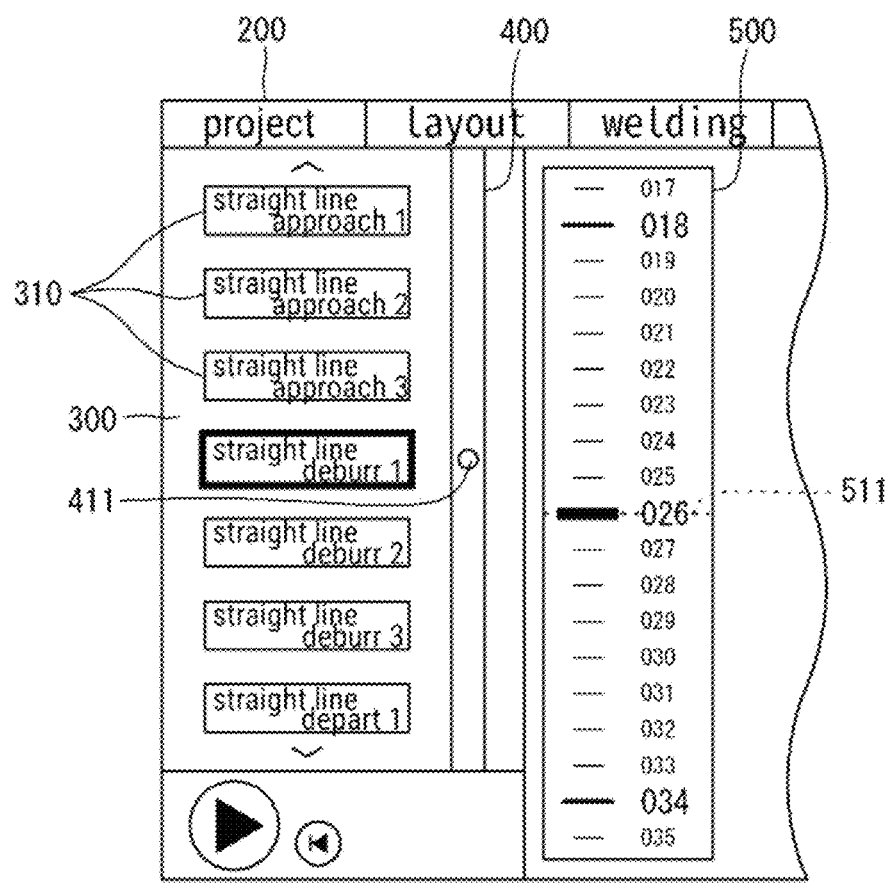
[FIG. 9C] A diagram showing an example of a display form of the programming screen when a teaching point is selected.

When checking the movement trajectory of the robot or changing the operation program, it is convenient if the user can check what posture the robot takes at the teaching point. The OLP device 100 of this embodiment provides a function for checking the posture of the robot at the teaching point in order to support programming. FIG. 9C shows an example of the display form of the programming screen 200 when the pointer 411 points to the teaching point.

In the example shown in FIG. 9C, when the pointer 411 points to one teaching point, the command box 310 of the selected teaching point in the command list area 300 is highlighted, and in the detail confirmation bar 500, the tick mark of the selected teaching point is also highlighted. The highlighting can be achieved, for example, by making the border of the command box 310 thicker, or the line of the tick mark on the detail confirmation bar 500 thicker. However, the highlighting may be done in other ways. For example, the color of the command box 310 may change to a different color from other command boxes 310, or the line of the tick mark on the detail confirmation bar 500 may blink, etc. This can notify the user that a teaching point has been set at the selected point in time. The user may adjust the position of the pointer until the command box 310 and the line of the tick mark in the detail confirmation bar 500 are highlighted. When both are highlighted, the user can confirm the posture of the robot represented in the animation display area 600.

[5. Modifications]

The configuration and operation of the OLP system for the present disclosure is not limited to the above embodiments. Specifically, the thing to be displayed is not limited to the simulation bar 400 as long as it shows a time series sequence of multiple teaching points.

For example, in the simulation bar 400, instead of indicating the section when the error occurred by the first error region 420 and indicating the section when the warning event occurred by the first warning region 430, in the command list area 300, the command box 310 in the section corresponding to the point in time when the error occurred may be displayed by the error color different from the color of the other command boxes, and the command box 310 in the section corresponding to the point in time when the warning event occurred may be displayed by the warning color different from the color of the other command boxes. Although the simulation bar 400 is provided, instead of the first error region 420 and the first warning region 430, the section when the error occurs may be indicated by an arrow or other symbol, or the tick mark of that section may be indicated by displaying (for example, blinking) differently from the tick mark of other sections.

In the above embodiment, the first error display method is to display the partial area of the simulation bar 400 corresponding to the point in time when the error occurs with the error color, but is not limited to this. For example, the partial area of the simulation bar 400 corresponding to the point in time when the error occurs may be displayed blinking. In the above embodiment, the second error display method is to display the partial area of the detail confirmation bar 500 corresponding to the point in time when the error occurs with the error color, but is not limited to this. For example, the partial area of the detail confirmation bar 500 corresponding to the point in time when the error occurs may be displayed blinking.

[6. Effects]

As described above, the OLP device 100 includes the input unit 101, the creation unit 102, the simulation unit 103, and the display unit 104. The input unit 101 receives input of a plurality of teaching points. The creation unit 102 determines one or more intermediate points located between adjacent teaching points and creates an operation program for the robot. The operation program includes the plurality of teaching points and intermediate point. The simulation unit 103 simulates the movement trajectory of the robot when the operation program is executed. The display unit 104 displays the programming screen 200 (GUI screen) representing the movement trajectory of the robot. The programming screen 200 includes the simulation bar 400 and the detail confirmation bar 500. The simulation bar 400 shows the time series sequence of the plurality of teaching points. The detail confirmation bar 500 shows a time series sequence of a plurality of the intermediate points between some of the plurality of teaching points included in the simulation bar 400 on a larger scale than the simulation bar 400. When the error is detected in the movement trajectory, the simulation bar 400 can display the section between the teaching points by the first error display method. The section includes the point in time when the error occurs. The detail confirmation bar 500 can display the intermediate point corresponding to the point in time when the error occurs, by the second error display method. Here, "section between the teaching points" may include the teaching points at both ends, or exclude the teaching points at both ends. "Section between the teaching points" may be a section including the teaching point at one end and not including the teaching point at the other end. As long as the intermediate point corresponding to the point in time when the error occurs is indicated by the second error display method, only the intermediate point may be indicated by the second error display, or the section including the intermediate point may be indicated by the second error display.

With the above configuration, in the detail confirmation bar 500, the intermediate point corresponding to the point in time when the error occurs is indicated by the second error display method. Thus, the user can be notified of the error between the teaching points.

The input unit 101 may receive input of the command including a teaching point and an instruction of the movement direction of the robot at the teaching point. The programming screen 200 may include the command list area 300. In the command list area 300, the plurality of command boxes 310 (symbols), respectively indicating a plurality of the commands, are arranged in a row. The simulation bar 400 is located parallel to the row of the command boxes 310 in the command list area 300. The simulation bar 400 may be able to display the teaching point at which an error occurs in a manner corresponding to the command box 310 in the command list area 300.

As a result, according to the command box 310 lined up in the command list area 300, the teaching point where the error occurs is indicated in the simulation bar 400. Thus, the user can easily understand in which command the error occurs. In other words, the user can easily identify the command that should be corrected.

The simulation bar 400 may include a linear section parallel to the row of the command boxes 310 in the command list area 300. The first error display method may be a method in which the portion of the linear section in which the error occurs is displayed in the error color.

Accordingly, the error can be displayed while the area of the simulation bar 400 parallel to the command list area 300 is reduced.

A portion of the simulation bar 400 may be able to be selected by the user. In the detail confirmation bar 500, the time series sequence of the plurality of intermediate points in the portion selected by the user in the simulation bar 400 may be able to be displayed at a larger scale than in the simulation bar 400.

Accordingly, when the user selects the portion of the simulation bar 400 that the user wishes to review in detail, the user can be provided with detailed information on the selected portion.

The display unit 104 may be able to display the point in time selected in the simulation bar 400 by the user, in the detail confirmation bar 500, in a different manner than other points in time.

This allows the user to understand the point in time selected by the user in the detail confirmation bar 500 while it is distinguished from other points in time.

The input unit 101 may be able to receive an instruction to add a command in a state where the user selects a portion of the simulation bar 400. The creation unit 102 may create the operation program again by adding a teaching point at the point in time selected by the user in the simulation bar 400 when the creation unit receives the instruction to add the command.

This allows the user to add a new command by precisely specifying intermediate point that is more detailed than the teaching point.

When the point in time selected by the user in the simulation bar 400 coincides with a point in time corresponding to one teaching point, the display unit 104 may be able to display the teaching point at the selected point in time in the detail confirmation bar 500, in a different manner than the other teaching points.

This allows the user to be notified that the point in time corresponding to the teaching point is selected.

The first error display method may be a method in which, when the error occurs between two adjacent teaching points, the section between the two teaching points on the simulation bar 400 is displayed with the error color.

This allows the user to identify in which of the multiple sections between the multiple teaching points the error occurs.

The first error display method also may be a method in which, when the error occurs at one teaching point, the section between the two teaching points that sandwich the one teaching point in the simulation bar 400 is displayed in the error color.

This allows the user to identify at which of the multiple teaching points the error occurs. Furthermore, since the section between the teaching points adjacent to the teaching point where the error occurs is displayed in the error color, the area where the error color is displayed is larger than when only the teaching point where the error occurs is highlighted. Therefore, the user can recognize the section easily.

The second error display method may be a method in which the section between a plurality of the intermediate points including the point where the error occurs in the detail confirmation bar 500 is displayed in the error color.

This allows the user to be notified of the detailed occurrence point of the error by a finer section than between the teaching points.

When the warning event is detected in the movement trajectory, the section including the teaching point corresponding to the point in time when the warning event occurs may be able to be displayed in the simulation bar 400, in the warning color.

This allows the user to be notified of the occurrence point of the warning event, which is more minor than the error, as distinct from the error occurrence point.

When the first error region 420 overlaps with the first warning region 430, the first error region 420 may be able to be displayed in the error color, and the portion of the first warning region 430 except for the portion overlapping the first error region 420 may be able to be displayed in the warning color.

This allows the section of occurrence of the error, being more important than the section of occurrence of the warning event, can be displayed with priority over the section of occurrence of the warning event.

The input unit 101 may be able to receive input both a plurality of movement commands that define the posture and the movement direction of the robot at each point in time and a non-movement command that does not define the posture and the movement direction of the robot. The simulation bar 400 may display a time series sequence including the teaching points for each of the multiple movement commands and including the non-movement command. When a section including some of the plurality of the teaching points and the non-movement command included in the simulation bar 400 is displayed in the detail confirmation bar 500, a time series sequence of the plurality of intermediate points between the plurality of teaching points excluding the non-movement command in this section may be able to be displayed in the detail confirmation bar 500.

Accordingly, in the detail confirmation bar 500, a second teaching point that does not appear in the movement trajectory generated by the simulation is not displayed, and first teaching points and the intermediate points included in the movement trajectory are displayed. Therefore, the detailed movement trajectory can be provided to the user in time series order.

[7. Supplemental Note]

The embodiments disclosed here are in all respects illustrative and not restrictive. The scope of the invention is indicated by the claims, not by the embodiments described above, and includes all modifications within the meaning and scope of the claims and equivalents thereto.

DESCRIPTION OF THE REFERENCE NUMERALS

100 Offline programming device
101 Input unit
102 Creation unit
103 Simulation unit
104 Display unit
110 Processor
120 Non-transient memory
130 Transient memory
140 Input/output interface
150 Input device
160 Display device
170 OLP program
200 Programming screen (GUI screen)
300 Command list area
310 Command box (symbol)
400 Simulation bar (first display area)
411 Pointer
420 First error region
430 First warning region
500 Detail confirmation bar (second display area)
511 Indicator
520 Second error region
600 Animation display area

The invention claimed is:

1. An offline programming device, comprising:
a receiver to receive input of a plurality of teaching points, each teaching point of the plurality of teaching points defining any of a movement point of a robot. a movement direction of the robot and an operation performed by the robot;
creation circuitry configured to
determine an intermediate point located between adjacent teaching points of the plurality of teaching points, and
generate an operation program for the robot, the operation program including the plurality of teaching points and the intermediate point;
simulation circuitry configured to simulate a movement trajectory of the robot when the operation program is executed; and
a display to display a graphical user interface (GUI) screen representing the movement trajectory, wherein the GUI screen includes:
a list display area including command symbols representing the plurality of teaching points in sequential order,
a first display area including a pointer and command bar, the command bar corresponding to a time series sequence of the command symbols in the list display area, and
a second display area including a time series sequence of a plurality of intermediate points located between adjacent teaching points represented by adjacent command symbols displayed in the first list display area and identified by the pointer, the second display area showing the time series sequence on a larger scale than the time series sequence in the list display area, and
when an error is detected in the movement trajectory:
the first display area displays a first error region corresponding to two particular command symbols in the time series sequence of the command symbols, the first error region representing a period of time between teaching points corresponding to the two particular command symbols during which the error occurs, and
the second display area displays one or more intermediate points corresponding to the first error region, and displays a second error region corresponding to a point in time at which the error occurs.

2. The offline programming device according to claim 1, wherein
the receiver receives input of a command including one or more of the plurality of teaching points, and
the first display area is located parallel to the symbols in the list display area.

3. The offline programming device according to claim 2, wherein
the first display area includes the first error region which is parallel to a column of the symbols in the list display area, and
a portion of the first error region in which the error occurs is displayed in a specific color.

4. The offline programming device according to claim 1, wherein
a portion of the first display area is selectable by a user, and
in the second display area, a time series sequence of the plurality of intermediate points in the portion selected by the user in the first display area is displayed at a larger scale than in the first display area.

5. The offline programming device according to claim 4, wherein the display displays a point in time, corresponding to the portion selected by the user, in the second display area.

6. The offline programming device according to claim 4, wherein
the receiver receives an instruction to add a command in a state where the user selects the portion of the first display area, and
the creation circuitry creates the operation program again by adding a teaching point at a point in time corresponding to the portion selected by the user in the first display area when the creation circuitry receives the instruction to add the command.

7. The offline programming device according to claim 4, wherein when a point in time corresponding to the portion selected by the user in the first display area coincides with another point in time corresponding to one teaching point, the display displays the one teaching point in the second display area in a different manner than another teaching point.

8. The offline programming device according to claim 1, wherein when an error occurs between two adjacent teaching points, the first error region is displayed between the two teaching points in the first display area and in a specific color.

9. The offline programming device according to claim 1, wherein when an error occurs at one teaching point, the first error region is displayed between the two teaching points that sandwich the one teaching point in the first display area and in a specific color.

10. The offline programming device according to claim 8, wherein the second error region corresponding to the point in time is displayed as corresponding to the first error region and in a specific color.

11. The offline programming device according to claim 8, wherein when an event requiring a warning to the user is detected in the movement trajectory, a warning region corresponding to a point in time at which the event occurs is displayed in the first display area, and the warning region is displayed in a warning color different from the specific color.

12. The offline programming device according to claim 11, wherein when a first section to be displayed in the specific color overlaps a second section to be displayed in the warning color, the first section is displayed in the specific color and a portion of the second section except for a portion overlapping the first section is displayed in the warning color.

13. The offline programming device according to claim 1, wherein
the receiver receives input of a plurality of movement commands that define a posture and a movement direction of the robot at each point in time, and receives input of a non -movement command that does not define the posture and the movement direction of the robot,
the first display area displays the command bar corresponding to the time series sequence of the command symbols representing the plurality of teaching points for each of the multiple movement commands and the non-movement command, and
when a section including some command symbols representing some of the plurality of teaching points and the non-movement command is displayed in the second display area, the time series sequence of the plurality of intermediate points between adjacent command symbols excluding the non-movement command in the section is displayed in the second display area.

14. The offline programming device according to claim 1, wherein the first display area is between the list display area and the second display area.

15. The offline programming device according to claim 1, wherein the time series sequence of the plurality of intermediate points in the second display and the time series sequence of the command symbols in the list display area are oriented along a same axis.

16. The offline programming device according to claim 15, wherein the time series sequence of the plurality of intermediate points is taller than the time series sequence of the command symbols.

17. The offline programming device according to claim 15, wherein the time series sequence of the plurality of intermediate points is wider than the time series sequence of the command symbols.

18. The offline programming device according to claim 1, wherein the second display area further includes
- a first mark corresponding to a first command symbol of the two particular command symbols,
- a second mark corresponding to a second command symbol of the two particular command symbols, and
- the plurality of intermediate points are located between the first mark and the second mark.

19. The offline programming device according to claim 18, wherein the GUI screen is displayed such that the first tick mark and the second tick marks blink.

20. An offline programming method, comprising:
- receiving input of a plurality of teaching points, each teaching point of the plurality of teaching points defining any of a movement point of a robot, a movement direction of the robot and an operation performed by the robot;
- determining an intermediate point located between adjacent teaching points of the plurality of teaching points;
- generating an operation program for the robot, the operation program including the plurality of teaching points and the intermediate point;
- simulating a movement trajectory of the robot when the operation program is executed; and
- displaying a graphical user interface (GUI) screen representing the movement trajectory, wherein
the GUI screen includes:
- a list display area including command symbols representing the plurality of teaching points in sequential order,
- a first display area including a pointer and command bar, the command bar corresponding to a time series sequence of the command symbols in the list display area, and
- a second display area including a time series sequence of a plurality of intermediate points located between adjacent teaching points represented by adjacent command symbols displayed in the list display area and identified by the pointer, the second display area showing the time series sequence on a larger scale than the time series sequence in the list display area, and
when an error is detected in the movement trajectory:
- the first display area displays a first error region corresponding to two particular command symbols in the time series sequence of the command symbols, the first error region representing a period of time between teaching points corresponding to the two particular command symbols during which the error occurs, and
- the second display area displays one or more intermediate points corresponding to the first error region, and displays a second error region corresponding to a point in time at which the error occurs by a second error display method.

* * * * *